US008782607B2

(12) United States Patent
Andersen et al.

(10) Patent No.: US 8,782,607 B2
(45) Date of Patent: Jul. 15, 2014

(54) CONTRACT FAILURE BEHAVIOR WITH ESCALATION POLICY

(75) Inventors: Melitta L. G. Andersen, Redmond, WA (US); Michael Barnett, Seattle, WA (US); Manuel A. Fahndrich, Seattle, WA (US); Brian M. Grunkemeyer, Redmond, WA (US); Katherine E. King, Seattle, WA (US); Michael M. Magruder, Carnation, WA (US); Andrew J. Pardoe, Bellevue, WA (US); Kumar Gaurav Khanna, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1000 days.

(21) Appl. No.: 12/389,373

(22) Filed: Feb. 20, 2009

(65) Prior Publication Data

US 2010/0218169 A1    Aug. 26, 2010

(51) Int. Cl.
*G06F 9/44* (2006.01)
*G06F 11/36* (2006.01)
*G06F 11/32* (2006.01)

(52) U.S. Cl.
CPC ........ *G06F 11/3664* (2013.01); *G06F 11/3668* (2013.01); *G06F 11/3636* (2013.01); *G06F 11/323* (2013.01)
USPC ............................ 717/125; 126/120; 126/101

(58) Field of Classification Search
CPC ............ G06F 11/3664; G06F 11/3688; G06F 11/3636; G06F 11/323
See application file for complete search history.

(56) References Cited

U.S. PATENT DOCUMENTS

| | | | |
|---|---|---|---|
| 6,336,148 B1 | 1/2002 | Doong | |
| 6,442,750 B1 | 8/2002 | Lopes | |
| 6,513,154 B1 * | 1/2003 | Porterfield | ..................... 717/101 |
| 6,959,432 B2 | 10/2005 | Crocker | |
| 7,039,898 B2 | 5/2006 | Shah | |
| 7,065,745 B2 | 6/2006 | Chan | |
| 7,168,063 B2 | 1/2007 | Meijer | |
| 7,216,337 B2 | 5/2007 | Lambert | |
| 7,216,338 B2 | 5/2007 | Barnett | |
| 7,228,528 B2 * | 6/2007 | Wang et al. | ................... 717/131 |
| 7,316,005 B2 * | 1/2008 | Qadeer et al. | ................ 717/131 |
| 7,346,897 B2 | 3/2008 | Vargas | |

(Continued)

OTHER PUBLICATIONS

Gunjan Doshi, Best Practices for Exception Handling, 2003, pp. 1-2.*

(Continued)

*Primary Examiner* — Thuy Dao
*Assistant Examiner* — Mongbao Nguyen
(74) *Attorney, Agent, or Firm* — Tony Azure; Andrew Sanders; Micky Minhas

(57) ABSTRACT

An error handling system is described herein that provides a facility for controlling the behavior of software when the software violates a contract condition. The system provides configurable runtime behavior that takes place when a contract fails. The error handling system provides an event that a hosting application or other software code can register to handle and that the system invokes upon detecting a contract failure. The application's response to the event determines how the system handles the failure. If the event is unhandled, the system triggers an escalation policy that allows an administrator or application to specify how the system handles contract failures. Thus, the error handling system provides increased control over the handling of contract failures within software code.

18 Claims, 3 Drawing Sheets

(56) References Cited

U.S. PATENT DOCUMENTS

| | | | |
|---|---|---|---|
| 7,367,015 B2 * | 4/2008 | Evans et al. | 717/110 |
| 7,367,022 B2 * | 4/2008 | Lueh et al. | 717/151 |
| 7,389,495 B2 * | 6/2008 | Wang et al. | 717/126 |
| 7,421,680 B2 | 9/2008 | DeLine | |
| 7,487,380 B2 * | 2/2009 | Brumme et al. | 714/3 |
| 7,496,896 B2 * | 2/2009 | Bley et al. | 717/127 |
| 7,526,755 B2 | 4/2009 | DeLine | |
| 7,555,757 B2 | 6/2009 | Smith | |
| 7,574,692 B2 | 8/2009 | Herscu | |
| 7,685,568 B2 * | 3/2010 | Brendle et al. | 717/120 |
| 7,685,570 B2 * | 3/2010 | Draine et al. | 717/125 |
| 7,707,547 B2 | 4/2010 | Colton | |
| 7,784,030 B2 * | 8/2010 | Christfort et al. | 717/120 |
| 7,788,644 B2 * | 8/2010 | Koduru et al. | 717/127 |
| 7,810,072 B2 * | 10/2010 | Barcia | 717/125 |
| 7,840,673 B1 * | 11/2010 | O'Crowley | 709/226 |
| 7,844,955 B2 * | 11/2010 | Tateishi et al. | 717/131 |
| 7,844,958 B2 | 11/2010 | Colton | |
| 7,861,072 B2 * | 12/2010 | Duffy et al. | 712/244 |
| 7,934,207 B2 | 4/2011 | Gustafsson | |
| 8,032,860 B2 | 10/2011 | Piehler | |
| 8,136,102 B2 | 3/2012 | Papakipos | |
| 8,136,104 B2 | 3/2012 | Papakipos | |
| 8,209,666 B1 * | 6/2012 | Schaub et al. | 717/125 |
| 8,250,524 B2 | 8/2012 | Barnett | |
| 8,365,149 B2 * | 1/2013 | Frank et al. | 717/125 |
| 8,402,438 B1 * | 3/2013 | Andrews et al. | 717/126 |
| 2002/0040470 A1 * | 4/2002 | Guthrie et al. | 717/126 |
| 2002/0169999 A1 * | 11/2002 | Bhansali et al. | 714/26 |
| 2003/0018961 A1 * | 1/2003 | Ogasawara | 717/158 |
| 2003/0084429 A1 * | 5/2003 | Schaefer | 717/125 |
| 2004/0103405 A1 | 5/2004 | Vargas | |
| 2004/0139426 A1 * | 7/2004 | Wu | 717/120 |
| 2004/0255268 A1 | 12/2004 | Meijer | |
| 2004/0261053 A1 * | 12/2004 | Dougherty et al. | 717/101 |
| 2004/0261065 A1 | 12/2004 | Abrams | |
| 2004/0268293 A1 * | 12/2004 | Woodgeard | 717/101 |
| 2005/0010895 A1 | 1/2005 | Reddappagari | |
| 2005/0015750 A1 * | 1/2005 | Bley et al. | 717/127 |
| 2005/0028137 A1 | 2/2005 | Evans | |
| 2005/0076331 A1 | 4/2005 | Das | |
| 2005/0081192 A1 | 4/2005 | DeLine | |
| 2005/0102656 A1 | 5/2005 | Viehland | |
| 2005/0108682 A1 | 5/2005 | Piehler | |
| 2005/0246690 A1 * | 11/2005 | Horton et al. | 717/125 |
| 2005/0246716 A1 | 11/2005 | Smith | |
| 2005/0273764 A1 | 12/2005 | Martin | |
| 2005/0283763 A1 * | 12/2005 | Fujikawa et al. | 717/124 |
| 2006/0101401 A1 * | 5/2006 | Brumme et al. | 717/124 |
| 2006/0112373 A1 * | 5/2006 | Rokosz | 717/125 |
| 2006/0265704 A1 | 11/2006 | Holt | |
| 2007/0039010 A1 | 2/2007 | Gadre | |
| 2007/0157169 A1 | 7/2007 | Chen | |
| 2007/0220370 A1 | 9/2007 | Branda | |
| 2008/0052680 A1 * | 2/2008 | Thebes et al. | 717/124 |
| 2008/0120300 A1 * | 5/2008 | Detlefs et al. | 707/8 |
| 2008/0127205 A1 * | 5/2008 | Barros | 719/313 |
| 2008/0134160 A1 | 6/2008 | Belapurkar | |
| 2008/0209395 A1 | 8/2008 | Ernst | |
| 2008/0216052 A1 | 9/2008 | Hejlsberg | |
| 2008/0282229 A1 * | 11/2008 | Kim et al. | 717/124 |
| 2008/0289026 A1 | 11/2008 | Abzarian | |
| 2008/0313613 A1 | 12/2008 | Bierhoff | |
| 2008/0320275 A1 * | 12/2008 | Duffy et al. | 712/28 |
| 2009/0055603 A1 | 2/2009 | Holt | |
| 2009/0138855 A1 * | 5/2009 | Huene et al. | 717/125 |
| 2009/0164973 A1 * | 6/2009 | Barnett et al. | 717/110 |
| 2009/0327179 A1 * | 12/2009 | Strassner et al. | 706/14 |
| 2010/0050160 A1 * | 2/2010 | Balasubramanian | 717/126 |
| 2010/0198799 A1 | 8/2010 | Krishnan | |
| 2010/0262952 A1 | 10/2010 | Colton | |

OTHER PUBLICATIONS

Gigi Sayfan, Practical C++ Error Handling in Hybrid Environments, 2007, pp. 1-8.*

Tim McCune, Exception-Handling Antipatterns, 2006, pp. 1-7.*

Peter S. Magnusson, Simics: A Full System Simulation Platform, 2002, pp. 50-57.*

Egon Valentini, Development of a Framework for Contract-Based Testing of Software-Components, 2003, pp. 31-39.*

Nelly Delgado, A Taxonomy and Catalog of Runtime Software-Fault Monitoring Tools, 2004, pp. 859-863.*

Fahndrich, "Embedded Contract Languages", Proceedings of the 2010 ACM Symposium on Applied Computing, Mar. 22-26, 2010.

Gray, "Fine-Grained Interoperability through Mirrors and Contracts", Proceedings of the 20th Annual ACM SIGPLAN Conference on Object-Oriented Programming, Systems, Languages, and Applications, Oct. 16-20, 2005.

Klint, "Toward an Engineering Discipline for Grammarware", ACM Transactions on Software Engineering and Methodology, Jul. 2005.

Belt, "Enhancing SPARK's Contract Checking Facilities Using Symbolic Execution", Proceedings of the 2011 Annual ACM SIGAda International Conference on Ada, Nov. 6-10, 2011.

Barnett, "The Spec# Programming System: An Overview", Construction and Analysis of Safe, Secure, and Interoperable Smart Devices, International Workshop, Mar. 10-14, 2004.

Bohm, "Mapping a Single Assignment Programming Language to Reconfigurable Systems", The Journal of Supercomputing, Feb. 1, 2002.

Wilson, "Contract Programming 101, The Nuclear Reactor and the Deep Space Probe, Part 1", artima developer, The C++ Source, Jan. 1, 2006.

Zee, "Runtime Checking for Program Verification", 7th International Workshop on Runtime Verification, Mar. 13, 2007.

Zhao, "The VeriJava Programming System: An Overview", A short version presented at 1st Asian Working Conference on Verified Software (AWCVS 2006), Oct. 2006.

Tran, "Managed Assertions for Component Contracts", Proceedings of the Seventh World Conference on Integrated Design and Process Technology, Jun. 2003.

Tran, "Design and implementation of assertions for the common language infrastructure", IEE Proceedings—Software, Oct. 27, 2003.

PCT International Search Report and Written Opinion for Application No. PCT/US2008/084994, reference 322115.02, Jun. 16, 2009.

EP Communication for Application No. 08867832.1-2211/2238532 PCT/US2008084994, Reference EP70514RK900kap, Mar. 6, 2012.

EP Communication for Application No. 08 867 832.1-1954, Reference EP70514RK900kap, Apr. 29, 2013.

JP Final Rejection for Application No. 2010-539586, May 10, 2013.

* cited by examiner

__US 8,782,607 B2__

CONTRACT FAILURE BEHAVIOR WITH ESCALATION POLICY

BACKGROUND

There are many existing ways of validating software or aiding in the development of low defect software. Early programs included assertions that halted a program when an unexpected condition occurred. A software developer would "assert" that a particular condition was true (e.g., that a variable held a certain value or a value within a known range) to ensure that the program state met the developer's expectations. This kind of checking is often in addition to any handling of errors that can occur during normal program operation, so that such checks might only be included in builds of the software program for testing. Later systems, such as exceptions, sought to allow programs to continue to run in the face of errors, and included semantics for ensuring proper cleanup of local variables (e.g., unwinding). These systems allowed the developer to write fast and straightforward software code for the normal case, and contain code for handling errors (e.g., exceptions) in a predefined area. Software developers sometimes call functions or include code that throws exceptions without handling those exceptions, leading to unhandled exception errors and sometimes program termination.

A more recent system of software development, known by the names design by contract, programming by contract, contract programming, behavioral interfaces, and contract-first development, describe an approach that includes formal, precise, and verifiable specifications for software components based upon the theory of abstract data types and the conceptual metaphor of a business contract. Contracts may specify preconditions, postconditions, object invariants, and so forth related to the operation of software. Contract preconditions impose a certain obligation for a client module to meet on entry to a particular component. Preconditions enable the component to avoid handling cases outside of the precondition. Contract postconditions guarantee a property on exit, such as that a variable will be in a specified range. Postconditions free the caller from handling cases outside of the postcondition. Object invariants ensure that software maintains a certain property upon entry and exit. Contracts provide information that can be used not only at runtime, but also by static analysis systems that verify software code by static inspection without running the code, and for other uses such as producing automatically checked documentation and enhancing Integrated Development Environment (IDE) support for programmers. For example, Microsoft Research described a design by contract system for use with Microsoft .NET at the 2008 Professional Developer's Conference (PDC).

Software has grown so complex that component reuse is common and many software programs invoke external components or include components (e.g., by static linking) internally that were not written or verified by the program author. For example, a data mining application may invoke a database library for establishing connections to a database and receiving data from the database in response to queries. In addition, programs may include whole platform paradigms that differ from the main paradigm of the program. For example, a native C++ application may invoke managed Microsoft .NET software classes to perform certain actions. Any part of such complex systems may include contracts as well as failures that other parts of the system do not anticipate or handle. For example, if a native application invokes managed code, and the managed code hits an exception or other failure, the native application state may be corrupted or the native application may terminate because the native application is unaware of or was not designed to handle the failure. Conversely, a managed application may call into native code that corrupts the application state or experiences some other failure.

A contract failure indicates that a program may be running in an unknown state, such as operating on parameter values or other data that the program author did not expect or expressly forbade. In many cases, contracts are enforced in debug builds through assertions and other facilities that provide information to the developer to find and handle a software defect. In retail builds, programs may not contain contract checks and may instead continue to run in spite of the unexpected condition, causing unexpected and possibly harmful behavior. In some cases, the unexpected condition may corrupt the state of the program and ultimately the user's data. Some systems may throw an exception when a contract fails, which the program may handle incorrectly or not handle at all, leading the operating system to shut down the program, or worse, the program incorrectly continues to run with corrupted data. This may not be desirable, particularly when the errant software program is running as part of a larger program that wants to continue running despite the failure. The handling of the contract failure may be incompatible with the way the rest of the program handles errors.

SUMMARY

An error handling system is described herein that provides a facility for controlling the behavior of software when the software violates a contract condition, such as when the software is hosted by a hosting application. The system provides configurable runtime behavior that takes place when a contract fails. In some embodiments, the error handling system provides an event that a hosting application or other software code can register to handle and that the system invokes upon detecting a contract failure. The application's response to the event determines how the system handles the failure. If the event is unhandled, the system may trigger an escalation policy that allows an administrator or application to specify how the system handles contract failures. Alternatively or additionally, the error handling system provides a hosting application programming interface (API) through which a host application can respond to contract failures in hosted software code. Thus, the error handling system provides increased control over the handling of contract failures within software code.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

An error handling system is described herein that provides a facility for controlling the behavior of software when the software violates a contract condition, such as when the software is hosted by a hosting application. The system provides highly configurable runtime behavior that takes place when a contract fails. In some embodiments, the error handling system provides an event that a hosting application or other software code can register to handle and that the system invokes upon detecting a contract failure. The application's response to the event determines how the system handles the failure. For example, when a contract failure occurs, the system may fire an event for which a software developer can write a custom handler. If the event is unhandled (either because there is no handler or because the handler could not handle the event), the system may trigger an escalation policy that allows an administrator or application (such as a hosting application) to specify how the system handles contract failures. For example, the hosting application may specify an escalation policy that indicates that the system first writes a description of the failure to an event log and then invoke a debugger, log a crash dump, or terminate the application. Other escalation policies may include recovering from the failure by unloading all potentially corrupt state within a portion of the program, such as unloading an application domain, then resuming normal execution. Alternatively or additionally, the error handling system provides a hosting application programming interface (API) through which a host application can respond to contract failures in hosted software code. Thus, the error handling system provides increased control (such as to a host application) over the handling of contract failures within software code (such as that invoked by the host application).

System Components

Figure 1:
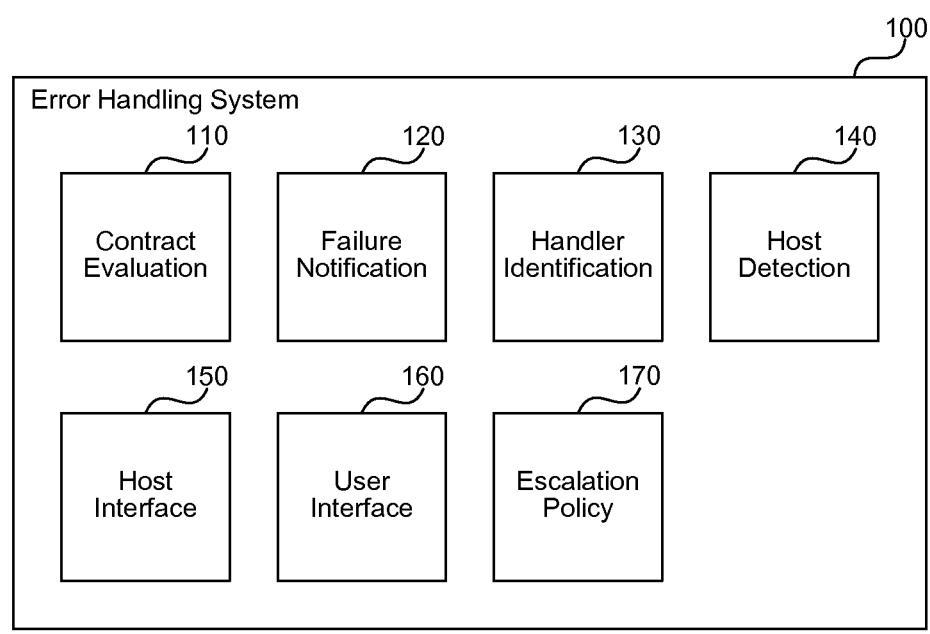
FIG. 1 is a block diagram that illustrates components of the error handling system, in one embodiment.

FIG. 1 is a block diagram that illustrates components of the error handling system, in one embodiment. The error handling system 100 includes a contract evaluation component 110, a failure notification component 120, a handler identification component 130, a host detection component 140, a host interface component 150, a user interface component 160, and an escalation policy component 170. Each of these components is described in further detail herein.

The contract evaluation component 110 determines whether the state of a software program meets a contract condition. The contract evaluation component 110 may include components that evaluate program state both statically and dynamically. For example, when a user invokes the software program, a dynamic component may dynamically check contract conditions by calling the Contract class at run time described further herein. The component can evaluate the contract conditions by executing the contract evaluation code just like any other source code. As another example, a static component may perform static analysis on a software program without running the software code, and may track a simulated model of the program state against which the component can test the contract conditions. If the contract evaluation component 110 determines that the program state meets the conditions of the contract, then the program continues. Otherwise, the component 110 indicates a failure and invokes the failure notification component 120.

The failure notification component 120 notifies other system components in response to a determination that a contract condition has failed. For example, if a variable passed to a function does not meet a contract condition, the failure handling component 120 may notify an event handler provided by a software developer for handling contract failures. The event handler can take a variety of actions in response to the failure, including logging the error to an event log, displaying a dialog box describing the error, emailing a software developer associated with the contract condition that failed, running an information capture application (such as the Microsoft Windows Error Reporting tool), and so forth. The event handler may also determine whether the failure indicates a condition for which the software program can continue or not. For example, the event handler may provide a return value that indicates to the failure notification component 120 whether the component 120 allows the program to continue or terminates the program.

The handler identification component 130 determines whether an application has registered an event handler for handling contract condition failures. An event handler may be provided by a software developer as source code or a module that the failure notification component 120 can call when a failure occurs. The software developer invokes a registration function to register the handler, which may contain a pointer or other reference to a function that is the event handler. In response to the registration, the system 100 stores a pointer or other reference to the event handler to invoke if a contract failure occurs. The handler identification component 130 may test the pointer or other reference stored by the system 100 to determine if an application has registered an event handler. The system 100 may perform one action upon contract failure when a handler is registered (e.g., calling the handler) and another action when no handler is registered (e.g., writing an event to an event log). In some embodiments, the system 100 may not call the handler even where one is provided, such as when there are multiple handlers and the system 100 selects one or when the system enforces trust restrictions on the handlers that the system 100 calls and the handler is not from a trusted source. The system may also decline a registration request that attempts to register an untrusted handler.

The host detection component 140 determines whether a software program is running within a hosted environment. A hosted environment is one in which the software program is being controlled or is providing services for another software program, sometimes within the same operating system process. For example, a database written in native C++ code may invoke one or more managed extensions written in C#. The database hosts the extensions and one or more Microsoft .NET application domains within which the extensions execute. Often the hosting software program invokes the hosted software program and provides some policy and control over how to execute the extension, or at least information to inform the hosted program that the program is executing within a hosted environment. The host detection component 140 uses this information to determine whether the program is hosted at the time of a contract failure. The system 100 may perform different actions in response to a contract failure for a program that is hosted than for one that is not hosted.

The host interface component 150 provides an interface through which a software program that hosts other software programs can interact with the system 100, such as to control the behavior of the system in response to a contract failure. For example, the hosting software program may be sensitive to data corruption and may configure the hosted environment so that any contract failure causes the hosted software program to terminate and clean up any resources that it allocated. This may be useful to preserve the integrity of the hosting application's resources. The hosting application may re-invoke the hosted application to create a fresh instance of the hosted application or may take other actions in response to a contract failure. For hosts with high resiliency and availability requirements, the host may specify an escalation policy for all types of failures via the host interface component 150, and the system 100 may trigger this escalation policy when a contract failure occurs. The host interface component 150 may also provide information from the system 100 to the hosting application, such as a notification when a contract failure occurs. Software developers may choose to use the host interface in place of registering an event handler for handling contract failures.

The user interface component 160 displays a graphical user interface to interact with a user of a software program when a contract condition of the software program fails. The user interface may include an assert dialog box when a contract assertion fails, or may include other displayed information, such as offering the user a choice of how to handle a contract failure (e.g., ignore and continue, abort the program, and so forth). The system 100 may perform different actions in response to a contract failure based on the user's response to the user interface. For example, in response to a contract assertion, the system may first display and assert dialog and then if the user selects to ignore the contract assertion, the system 100 may notify any registered contract event handler to handle the failure so that execution can continue. Alternatively, the system 100 may notify any registered event handler first and then display an assert dialog based on the response received from the event handler.

The escalation policy component 170 handles contract failures not handled by other components of the system. For example, if the system notified a contract failure event handler about the contract failure and the handler was unable to handle the failure, then the failure notification component 120 may notify the escalation policy component 170 to handle the failure. The escalation policy component 170 may provide a configuration interface through which an administrator, hosting program, or application developer can determine how the component 170 handles application failures (e.g., for multiple applications). Alternately, when hosted, this configuration interface could be part of the host interface component 150. The escalation policy component 170 may perform actions such as notifying an administrator, terminating an application, terminating the thread or appdomain, storing error information (e.g., a stack trace and/or object list) that can be used to fix the error, and so forth.

The computing device on which the system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on. A "computer-readable storage device", as used herein, encompasses statutory storage devices and media that are common in the art and does not include non-statutory transmission media or data signals.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
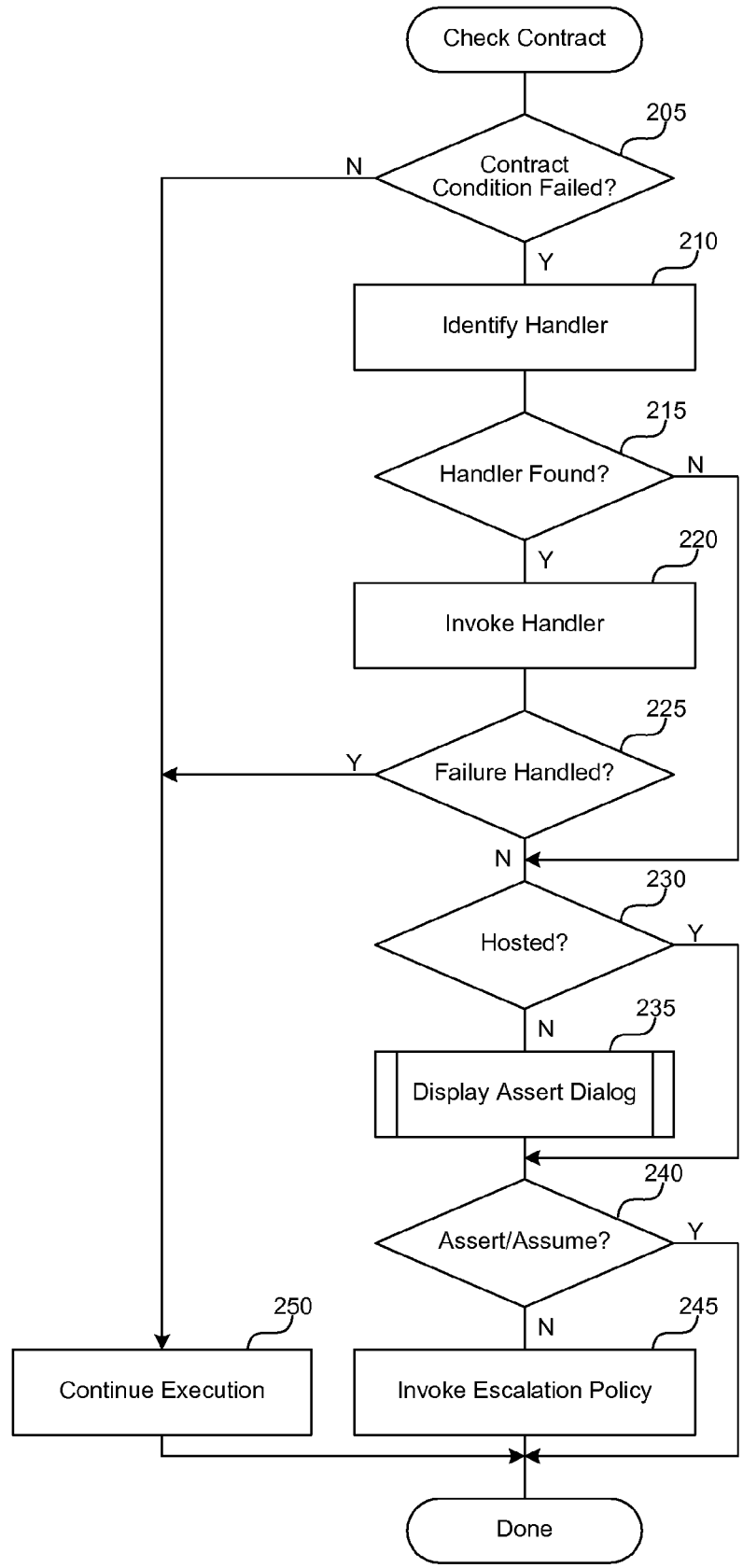
FIG. 2 is a flow diagram that illustrates the processing of the error handling system if a contract failure occurs, in one embodiment.

FIG. 2 is a flow diagram that illustrates the processing of the error handling system if a contract failure occurs, in one embodiment. In some embodiments, the error handling system may take three alternative actions or a combination of these actions upon the failure of a contract condition: continuing execution of the software code containing the contract check, displaying an assert dialog to a user, and invoking escalation policy to allow an administrator or application to determine how to handle the failure. These steps describe how the system determines which of these actions to select.

In decision block 205, the system determines whether a contract condition failed. For example, the system may include the contract conditions in a stream of instructions that execute along with software code that makes up the functional elements of a program. When a processor or other execution environment encounters a contract condition, it executes the condition similar to other software instructions. If the system determines that the condition failed, then the system continues at block 210, else the system continues at block 250. Continuing in block 210, the system attempts to identify an event handling routine for handling the contract failure. For example, the software code containing the failure or software code of a hosting application may register an event handler that the system identifies when a contract failure occurs. Continuing in decision block 215, if the system identified an event handler, then the system continues at block 220, else the system jumps to block 230.

Continuing in block 220, the system invokes the identified event handler. The system may pass information about the contract condition that failed, along with other information about the program state at the time and/or location of the failure. Continuing in decision block 225, if the invoked event handler handled the failure, then the system jumps to block 250, else the system continues at block 230. The event handler can handle the contract failure in any way deemed appropriate by the software developer that wrote the event handling routine. For example, the event handler may record information about the event and then request that the system continue execution, or the event handler may halt execution of the software code (e.g., if the handler suspects that the program state is corrupted such that further execution could corrupt data). The event handler may indicate whether the failure is handled such that execution can continue by returning a specified return code defined by the event handling interface. For example, a positive return code may indicate that execution continue while a negative return code may request that the system halt further execution.

Continuing in decision block 230, the system determines whether the software code containing the failed contract condition is currently hosted by another application. For example, an application may host a virtual machine or other separate software execution environment in which the software code was running. If the system determines that the software code is hosted, then the system jumps to block 240, else the system continues at block 235. Continuing in block 235, described further with reference to FIG. 3, the system displays an assert dialog to the user. The assert dialog may allow the user to ignore the assertion and continue execution, halt execution of the software code containing the assertion, or take some other appropriate action. Continuing in decision block 240, the system determines whether the failed contract condition is an assert or assume. Types of contract conditions are described further herein, and block 240 illustrates how the system may optionally handle some contract condition failures differently than others. For example, assertions (particularly in debug builds of software products) are historically displayed to a user (typically another developer) to decide whether execution continues. Thus, rather than immediately route a failed assert contract condition to application code for handling, the system may first prompt the user for an indication of whether or not to continue. If the system determines that the contract condition is an assertion or assumption, then the system optionally completes without invoking other handling code, else the system continues at block 245.

Through the steps described above, the system reaches one of the three alternatives for handling a failed contract condition. In block 250, the system continues execution of the software code containing the failed contract condition or for which no contract failure occurred (see block 205). For example, the system may have invoked a handler that satisfactorily handled the failed condition, such that continued execution is safe. In block 245, the system invokes an escalation policy to determine how to handle the failed condition. The escalation policy provides a way for administrators or program authors of host applications to ensure that failure behavior of hosted software code conforms to the expectations of the hosting application. For example, a hosting application may be expected to continue execution even upon failures of hosted software code. After block 245, these steps conclude.

Figure 3:
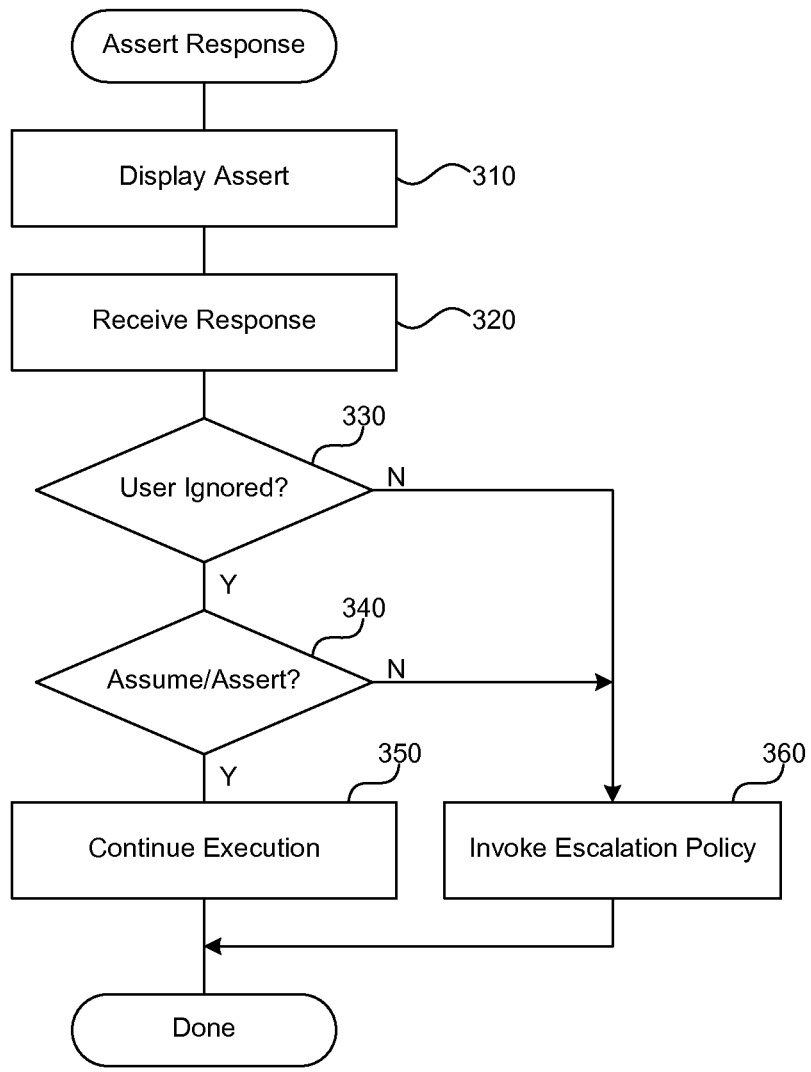
FIG. 3 is a flow diagram that illustrates the processing of the error handling system after reporting an assertion, in one embodiment.

FIG. 3 is a flow diagram that illustrates the processing of the error handling system after reporting an assertion, in one embodiment. In block 310, the system displays an assert dialog or other user interface to a user to report the assertion. For example, the system may display a dialog with buttons that allow the user to select to continue executing the program that caused the assertion or to terminate the program. Continuing in block 320, the system receives a response that indicates the user's action in response to the assert user interface. For example, the user may have clicked an ignore or continue button. Continuing in decision block 330, if the user response indicates for the system to ignore the assertion, then the system continues at block 340, else the system jumps to block 360. In some embodiments, the system may also provide an option in the assert user interface to abort the program (not shown), and if the user selects this option the system may terminate the program without further processing of the failure (e.g., without invoking escalation policy). Continuing in decision block 340, if the failed contract condition that caused the system to display the assertion was an assert or assume condition (described further herein), then the system continues at block 350, else the system continues at block 360.

Continuing in block 350, the system continues execution of the program. The system informed the user of the assertion and the user ignored the assertion, so there is no further action for the system to perform. Alternatively, if the system reaches block 360, then the system invokes the escalation policy to determine how to further handle the failed contract condition. The user may have indicated that the failure cannot be ignored, and the system may handle the failure based on steps configured by an administrator or specified by a hosting application for handling contract failures. For example, the hosting application may request that the hosted program write detailed error information to an error log and then close along with cleaning up any used resources (e.g., memory, temporary files, open registry keys, and so forth). After block 360, these steps conclude.

In some embodiment, the error handling system provides information about the contract failure in a distinguished type of software exception. Exceptions are commonly used in software to handle error conditions. However, software developers can also misuse exceptions to catch types of errors that are not understood and handling the errors incorrectly (e.g., by writing an exception handler that catches all error types and ignores them). Thus, the system may make the exception harder to catch by not allowing the exception to be caught unless the developer has performed an extra step specified by the system, such as setting a particular attribute on the exception handler. Corrupted state exceptions and thread aborts are two classifications of exceptions in Microsoft .NET 4.0 that are harder to catch than regular software exceptions, and that the system can use to provide contract failure exceptions.

In some embodiments, the error handling system provides guarantees to weakly typed languages similar to those inherent in strongly typed languages. Strongly typed languages verify a number of conditions when source code using those languages is compiled. For example, C++ source code cannot incorrectly assign an object of one type to a variable of another type. With strongly typed languages, contracts are often used to verify conditions beyond those conditions ensured by the language itself. The freedom provided by weakly typed languages, such as JavaScript and VBScript, allows fast programming in these languages, but can also lead to errors that would be easily caught in a strongly typed language, such as incorrect assignment of a variable. Contracts can be used with weakly typed languages to catch these types of errors, at least in a debug build or test run. For example, a contract condition may verify the type of a variable, the range of values that the variable holds, and so forth, to ensure that the condition meets the software developer's expectations. Here, a weakly typed language interpreter can both receive notification of a runtime failure and specify a handler to continue execution.

In some embodiments, the error handling system recognizes legacy exception types as contracts for backwards compatibility and to apply escalation policy to legacy exception failures. Legacy exceptions that are included are preconditions of the form "if [condition] throw [exception]." For example, "if(arg==null) throw new ArgumentNullException ("arg")." The system may provide a call that a software developer can insert to designate the end of contract preconditions of this type (e.g., Contract.EndContractBlock( )). The Contract.EndContractBlock( ) marker method allows tools to recognize all previous if-then-throw blocks as preconditions.

In some embodiments, the error handling system allows preconditions on class methods to be inherited. However, the system may prevent overrides and implementations from defining their own preconditions. Overrides/implementations can add postconditions that strengthen the postcondition that are Boolean "AND-ed" with any inherited postconditions. This helps software code with contracts to adhere to common developer expectations and is generally called "behavioral subtyping." In many situations, object-oriented programming languages allow a subtype to be used at runtime in the place of a static occurrence of a supertype. If a developer is calling a method M on a variable of static type T, then if the developer meet T.M's precondition the developer can call T.M without receiving a precondition violation. If the object at runtime really is a subtype of T the object cannot make the precondition any more restrictive. Similarly, the developer can depend on the postcondition of T.M so if the object is a subtype of T, it can provide more but not less than T.M promises.

In some embodiments, the error handling system enforces trust level of contract failure event handling code. Various programming environments allow software code to run at designated privilege levels. For example, Microsoft .NET specifies a privilege level for each application, and restricts the actions that an application can perform based on the application's privilege level. The system may only allow components with full trust or a particular threshold of trust to handle or provide a handler for a contract failure. The system can enforce handler trust restrictions at the time of handler registration (e.g., by failing a registration request) or when the handler is called (e.g., by allowing the handler to be registered but declining to invoke it). Otherwise malicious code running in the application domain could hook the event handler, be informed about defects in any code running in the application domain, and pretend the defects did not occur (so that execution continues with invalid state and potentially corrupts data).

Contracts

Contracts as used herein can refer to many types of behavioral guarantees associated with software source code. In some embodiments, the error handling system provides a Contract class that allows software developers to annotate their code with various types of information that are useful for runtime and static analysis tools. The Contract class provides the basis for building an equivalent of Standard Annotation Language (SAL) for managed code, as one example. SAL is a set of annotations developed by Microsoft that describe how a C/C++ programming language function will use its parameters. SAL annotations allow a programmer to declare guaranteed characteristics of a parameter, so that the compiler (or other tool such as a static checker) can verify the characteristics at compile time.

Currently, method signatures are the only way to expose enforceable requirements on a method, and these are limited to information about parameter types and the return type. Restrictions on values passed in or guarantees about the return value may be included in comments, but a developer cannot encode them programmatically to ensure enforcement. Tools cannot access preconditions and postconditions of methods or object invariants. A precondition is a state that is expected to exist to successfully call a method. A postcondition is a guarantee that a method makes about the state (e.g., of parameters or other objects) either upon successful completion or when the method terminates abnormally. An object invariant is a property about an object's internal state that is guaranteed to be true when the object is visible to clients (e.g., upon entry and exit of a method). An assertion is a property about internal program state that the programmer thinks is true and wants to verify at runtime. An assumption is a property about internal program state that the programmer believes is true, but cannot be proven automatically by tools (it may be checked at runtime).

The Contract class provides a standard way to express contract information and captures preconditions, postconditions, and object invariants in methods. It may also allow expressing internal implementation requirements such as assertions and assumptions. The Contract class is just one example of an implementation of the error handling system. Those of ordinary skill in the art will recognize that other implementations, such as applying contracts as object attributes rather than methods, can be used to implement the system. The Contract methods are discoverable by tools that can perform various tasks, e.g. inserting runtime contract checking, performing static analysis, or adding information to Microsoft Intellisense. Additionally, crisper behavioral agreement between a library author and a library consumer reduces integration costs between different groups. Contracts allow errors to be found through static analysis (e.g., without executing the software code), allow errors to be found before they manifest in a failure, and provide developer education by documenting expectations of a particular method. Typically, the system includes contract checks in debug builds so that the addition of contracts has no impact on size or performance in retail builds.

In some embodiments, the error handling system provides a binary rewriting application (e.g., ccrewrite.exe) that places contract condition checking instructions in the correct place in the software code to enable runtime checking (e.g., postconditions are checked on all return statements, as well as ensuring preconditions and postconditions are properly inherited by overridden methods). The system may also provide a static analysis tool (e.g., cccheck.exe) that verifies contract conditions.

In some embodiments, the error handling system provides the Contract class as a Microsoft .NET static class in a System.Diagnostics.Contracts namespace. Methods on the static Contract class are broken down into several groups based upon the type of contract. Contract methods may be marked with a [Pure] attribute to indicate that use of the methods does not produce any side effects in the software code that calls the methods. The system may also ensure that user methods called within contracts are similarly marked pure.

In general, contracts make a statement about a condition that is supposed to exist at a certain point in a program. The system can check these conditions either at runtime or statically with tools. Each type of method has an overload for specifying a string to display to the user if the contract fails at runtime. During static analysis, a string representation of the code in the condition may be used. The system may use the same string for runtime checking on a designated build that has been through the binary rewriter, unless the programmer has specified a different string.

The system uses many contracts (all except RequiresAlways) only when a developer defines a designated symbol, such as CONTRACTS_FULL. The system may also provide symbols for including particular types of contract checks, such as CONTRACTS_PRECONDITIONS to include preconditions or the DEBUG symbol to include Assert and Assume contracts.

In some embodiments, when a contract fails, the system fires a ContractFailedEvent that includes a ContractFailedEventArgs class as a parameter that provides data about what failed. The parameter also contains a Boolean flag that handlers set if they take care of the failure. The event handler gives applications a chance to specify the behavior upon contract failure. After the event has been fired, the system fires an assert to notify the user that a contract failure has happened and the system is about to trigger escalation policy. The system may not fire the assert in hosted situations or when the handler sets the Boolean indicating that the handler has taken care of the event. In the case where the assert fires, if the user chooses to ignore the error and continue and the ContractFailureKind is Assert or Assume, the system sets the Boolean flag to true to indicate that no further failure processing is needed.

If there is no event handler, or the value of the Boolean flag is false, the system invokes escalation policy. Escalation policy can be configured via the method ICLRPolicyManager.SetActionOnFailure with a new EClrFailure enumeration value FAIL_CodeContract. Possible failure behaviors are available in the existing EPolicyAction enumeration. The following code listing describes the event handler for handling a failed contract event.

```
// Declaring a handler
public static event EventHandler<ContractFailedEventArgs>
    ContractFailed;
// These are the event arguments that contain information about the
// contract failure.
public sealed class ContractFailedEventArgs : EventArgs
{
    public string Message { get; }
    public string Condition { get; }
    public ContractFailureKind FailureKind { get; }
    public Boolean Handled { get; set; }
    // When Message or Condition is null, the properties are set
    // to the empty string.
    public ContractFailedEventArgs(String message, string condition,
        ContractFailureKind failureKind);
}
// This enum allows the event arguments to provide information
// about what kind of contract failed.
public enum ContractFailureKind
{
    Precondition,
    Postcondition,
    ObjectInvariant,
    Assertion,
    Assumption
}
```

Assert methods have behavior like the assert methods that currently exist for debugging. In designated builds, the system performs a runtime check to verify that the condition is true. For Asserts, failure may not trigger escalation policy. The developer has the option of including a string to explain the issue for runtime failures. The methods in this group are the following.

```
public static void Assert (bool condition);
public static void Assert (bool condition, string message);
```

Assume methods are primarily used to give static analysis tools more information. There are sometimes conditions that a static analysis cannot prove. The assume is used to silence the warning while providing documentation (and optionally runtime checking) so that the developer is accountable for the assumption. These methods instruct code analysis tools to assume that the condition is true, even if it cannot be statically proven to be true. In designated builds, the system performs a runtime check to verify that the condition is true. (This runtime behavior is similar to a function from the Assert family of methods.) The developer has the option of including a string to explain the issue at runtime for debugging. The methods in this group are the following.

```
public static void Assume (bool condition);
public static void Assume (bool condition, string message);
```

Requires methods encapsulate preconditions. They specify that a certain expression is supposed to be true before the enclosing method or property is invoked. These calls happen at the beginning of a method or property before any other non-contract code. This contract is exposed to clients, so the expression can only reference members at least as visible as the enclosing method. In designated builds, these methods perform a runtime check to verify that the condition is true. There are two types of Requires methods, one that is only used for designated builds and one that is included in retail builds (named RequiresAlways).

```
public static void Requires (bool condition);
public static void Requires (bool condition, string message);
public static void RequiresAlways (bool condition);
public static void RequiresAlways (bool condition, string message);
```

Ensures methods encapsulate postconditions. They specify that a certain expression will be true after a method has executed. A software developer places these calls at the beginning of a method or property before any other non-contract code. This contract is exposed to clients, but may refer to private state. To enable runtime enforcement of these postconditions, a binary rewriter places the checks before each return. There are several different types of Ensures methods, each dealing with different ways of exiting a method or property.

```
// This method states that the condition will be true when the
// enclosing method or property returns normally.
public static void Ensures (bool condition);
public static void Ensures (bool condition, string message);
// This method states that the condition is true when the enclosing
// method or property throws an exception of type TException.
public static void EnsuresOnThrow<TException> (bool condition)
    where TException : Exception;
public static void EnsuresOnThrow<TException> (bool condition, string
    message) where TException : Exception;
```

Ensures methods make statements about conditions at the end of a method or property but are declared at the beginning. Because the parameters to these methods reference the return value, initial values, and out parameters, which are not necessarily in scope, available at the beginning of the method, or describable in the source programming language, the Contract class provides methods that can be used within arguments to Ensures contracts. If these methods are not used in Ensures, they will return null for reference types or the default value for value types. Examples of these methods follow.

```
// This method represents the return value of a method or property.
public static T Result<T> ( )
// This method represents the final (output) value of an out parameter.
public static T ValueAtReturn<T> (out T value)
// This method represents the value as it was at the start of the
// method or property and can be used to capture the pre-call value of
// any parameter, property, or method.
public static T OldValue<T> (T value)
```

An Invariant method specifies a condition that will be true after object creation (initialization or construction) and each public method (or property) on the enclosing class. This contract can only be specified in a dedicated invariant method declared on a class. Typically, there can only be one invariant method and it is marked with the ContractInvariantMethodAttribute attribute, but that method can include numerous calls to Contract.Invariant( ). The method is not exposed to clients, so the method may reference members less visible than the enclosing class. Runtime enforcement of these contracts uses a binary rewriter to place the checks in the correct place. The Invariant methods are as follows.

```
public static void Invariant (bool condition);
public static void Invariant (bool condition, string message);
```

Quantifiers are common logical expressions that can be used in contracts. ForAll applies a predicate to a set of inputs and returns true if and only if the predicate returns true on each of them. Exists returns true if any application of predicate to input returns true. Developers can apply these quantifiers to either a range of integers (e.g., to help static analysis tools that cannot analyze quantifiers that do not have explicit, finite bounds) or an IEnumerable<T>. Note that for the range of integers, the system includes the lower bound in the range but not the upper bound.

```
public static bool ForAll (int inclusiveLowerBound, int
        exclusiveUpperBound, Predicate<int> predicate);
public static bool ForAll<T> (IEnumerable<T> collection, Predicate<T>
        predicate);
public static bool Exists (int inclusiveLowerBound, int
        exclusiveUpperBound, Predicate<int> predicate);
public static bool Exists<T> (IEnumerable<T> collection, Predicate<T>
        predicate);
```

In some embodiments, the error handling system allows software developers to create contract classes that express contracts on types and methods for which the source programming language does not allow method bodies. This allows a developer to check for conditions that could not otherwise be specified inline in the source code using the methods described above. The tools that utilize contracts make it appear as if the contracts had been attached directly to the original types and methods. This idea can be extended to provide for out-of-band contracts, where the contracts for an entire component can be specified externally to the component itself, for instance, in a separate reference assembly.

Example Use of Contract Conditions

The following is software code showing an example of using the Contract class to place checks for contract conditions within an application. As shown below the Contract class implements contract checks as normal method calls to the Contract class that work from all 30+ Microsoft .NET languages without explicit language integration. This example shows the Microsoft .NET String.Insert function with contract condition checking added using the C# language.

```
public string Insert(int startIndex, string value)
{
    Contract.Requires(value != null);
    Contract.Requires(startIndex >= 0 && startIndex <= this.Length);
    Contract.Ensures(Contract.Result<String>( ) != null);
    Contract.Ensures(Contract.Result<String>( ).Length == this.Length +
        value.Length, "inserting the string didn't work");
    return InsertInternal(startIndex, value);
}
```

The following software code illustrates using the Invariant methods.

```
[ContractInvariantMethodAttribute]
void objectInvariant( ) // the name is recommended but not required
{
    // the current slot is always between zero and the last slot
    Contract.Invariant(0 <= _s && _s < _xs.Length);
    // all unused slots are null
    Contract.Invariant(Contract.ForAll(_s,_xs.Length, i =>
        _xs[i] == null));
}
```

From the foregoing, it will be appreciated that specific embodiments of the error handling system have been described herein for purposes of illustration, but that various modifications may be made without deviating from the spirit and scope of the invention. Accordingly, the invention is not limited except as by the appended claims.

We claim:

1. A computer-implemented method for allowing a software application to respond to a failed contract condition specified by an author of the application, the method comprising:
    determining whether a contract condition failed, wherein the contract condition is included in a stream of instructions that execute along with software code that comprises functional elements of the software application, and wherein in response to encountering a contract condition, the processor executes the condition alongside other software instructions;
    if the contract condition failed,
        determining whether an event handling routine is registered for handling the failed contract condition;
        in response to determining that an event handling routine is registered, invoking the event handling routine, wherein an error handling system provides an event that a hosting application that hosts hosted software code can register to handle and that the system invokes upon detecting a contract failure within the hosted software code in a manner that the hosting application's response to the event determines how the system further handles the failure;
        receiving a response from the event handling routine that indicates whether the event handling routine handled the failed contract condition and invoking the escalation policy in response to determining that the event handling routine did not handle the failed contract condition; and
        based on a returned result from the registered event handling routine, invoking an execution policy that specifies a configured action for handling contract condition failures,
    wherein the preceding steps are performed by at least one processor.

2. The method of claim 1 wherein determining whether a contract condition failed comprises statically determining whether the contract condition failed without executing the application.

3. The method of claim 1 wherein the software application is hosted by a hosting application and wherein the hosting application registers an event handling routine.

4. The method of claim 1 wherein invoking the event handling routine comprises passing information about the contract condition that failed and information about the program state to the event handling routine.

5. The method of claim 1 wherein the event handling routine can handle the failed contract condition by specifying that execution of the software application continue or execution of the software application terminate.

6. The method of claim 1 further comprising, before invoking the escalation policy,
    determining whether the software application containing the failed contract condition is currently hosted by another software application; and
    determining whether to display an assert user interface based on whether the software application is hosted.

7. The method of claim 1 further comprising, in response to determining that the event handling routine handled the failed contract condition, continuing execution of the software application.

8. The method of claim 1 further comprising, before invoking the escalation policy,
- determining whether the failed contract condition is an assert or assume type of contract condition; and
- in response to determining that the contract condition is an assert or assume, prompting a user for an indication of whether or not to continue execution of the software application.

9. A computer system for configuring behavior of software code after a condition fails that verifies correct operation of the software code, the system comprising:
- a processor and memory configured to execute software instructions;
- a contract evaluation component configured to determine whether the state of the software code meets a contract condition, wherein the contract condition is included in a stream of instructions that execute along with software code that comprises functional elements of a software application, and wherein in response to encountering a contract condition, the processor executes the condition alongside other software instructions;
- a failure notification component configured to notify a hosting application in response to a determination that the contract condition has failed, wherein the system provides an event that the hosting application that hosts hosted software code can register to handle in an event handling routine that the system invokes upon detecting a contract failure within the hosted software code to receive a response from the event handling routine that indicates whether the event handling routine handled the failed contract condition in a manner that the hosting application's response to the event determines how the system further handles the failure;
- a handler identification component configured to determine whether the hosting application has registered an event handler for handling contract condition failures; and
- an escalation policy component configured to handle contract failures not handled by other components of the system, wherein the escalation policy component provides a configuration interface through which an administrator, hosting program, or application developer can determine how the component handles condition failures, and wherein the system invokes the escalation policy in response to determining that the event handling routine did not handle the failed contract condition.

10. The system of claim 9 wherein the contract evaluation component includes components that evaluate program state both statically and dynamically.

11. The system of claim 9 wherein the contract evaluation component is further configured to evaluate preconditions, postconditions, and invariants in the software code.

12. The system of claim 9 wherein the failure notification component performs one action in response to a contract failure if the handler identification component identifies a handler and a different action if the handler identification component does not identify a handler.

13. The system of claim 9 wherein the handler identification component is further configured to determine whether the event handler meets a threshold level of trust for handling contract condition failures.

14. The system of claim 9 further comprising:
- a host detection component configured to determine whether the software code is running within a hosted environment, wherein the hosted environment invokes the software code and provides instructions for handling contract failures in the software code; and
- a host interface component configured to provide an interface through which the hosted environment can control the behavior of the system in response to a contract failure.

15. A computer-readable storage device comprising instructions for controlling a computer system to handle to a user response to a software assertion, wherein the instructions, when executed, cause a processor to perform actions comprising:
- displaying an assert user interface to the user to report a failed contract condition in a software program, wherein the contract condition is included in a stream of instructions that execute along with software code that comprises functional elements of a software application, wherein in response to encountering a contract condition, the processor executes the condition alongside other software instructions, and wherein an error handling system provides an event that a hosting application that hosts hosted software code can register to handle and that the system invokes upon detecting a contract failure within the hosted software code in a manner that the hosting application's response to the event determines how the system further handles the failure;
- receiving a response that indicates the user's action in response to the assert user interface wherein receiving the response includes processing the response in an event handling routine and receiving a response from the event handling routine that indicates whether the event handling routine handled the failed contract condition;
- if the user response indicates for the system to ignore the software assertion, continuing execution of the software program; and
- if the user response indicates for the system to handle the failed contract condition and in response to determining that the event handling routine did not handle the failed contract condition, invoking an escalation policy to determine how to further handle the failed contract condition.

16. The device of claim 15 wherein the assert user interface includes one or more controls for the user to specify whether that software program continues or terminates.

17. The device of claim 15 wherein the escalation policy specifies handling the failed contract condition by terminating the software code and cleaning up any resources allocated by the software code.

18. The device of claim 15 wherein the escalation policy is configurable by an administrator of the system and by a software application that hosts the software program.

* * * * *